(No Model.)  2 Sheets—Sheet 1.

E. E. WHIPPLE.
ATTACHMENT FOR HARROWS.

No. 600,662. Patented Mar. 15, 1898.

Witnesses
Geo. E. Frech
A. S. Pattison

Inventor
E. E. Whipple
per Hubert E. Peck
Attorney (No Model.) 2 Sheets—Sheet 2.
E. E. WHIPPLE.
ATTACHMENT FOR HARROWS.
No. 600,662. Patented Mar. 15, 1898.
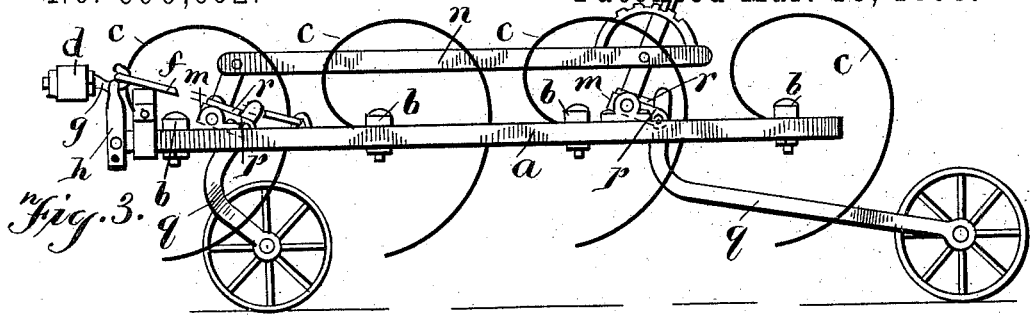
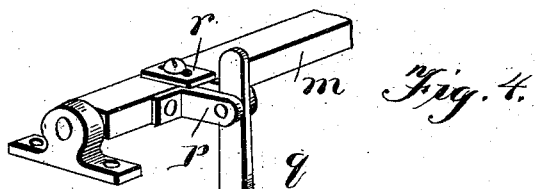
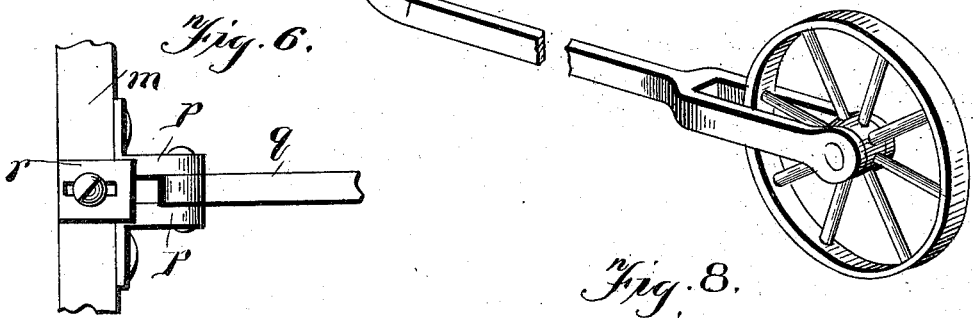
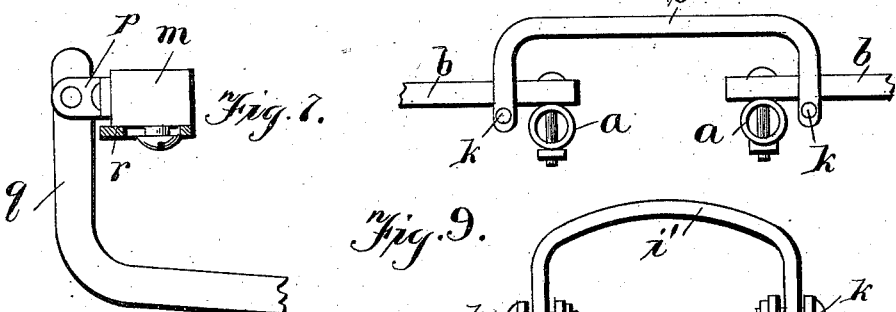
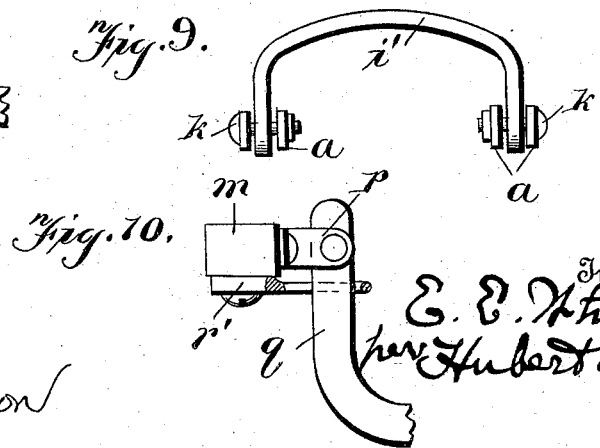
Witnesses
Geo. E. Fuch.
A. S. Pattison.
Inventor
E. E. Whipple
per Hubert E. Beck
Attorney
THE NORRIS PETERS CO., PHOTO-LITHO., WASHINGTON, D. C.

UNITED STATES PATENT OFFICE.

EFFINGER E. WHIPPLE, OF COOPERSTOWN, NEW YORK.

ATTACHMENT FOR HARROWS.

SPECIFICATION forming part of Letters Patent No. 600,662, dated March 15, 1898.

Application filed April 6, 1897. Serial No. 631,013. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Attachments for Harrows and the Like; and I do hereby declare the following to be a full, clear, and exact description of the invention, such as will enable others skilled in the art to which it appertains to make and use the same.

This invention relates to certain improvements in attachments for harrows.

Among the novel features hereinafter pointed out and claimed I claim, broadly, to be the first to have invented a wheeled device to be used in combination with a harrow, pivotally connected with each section thereof, which will carry each section of the harrow-frame in an elevated plane above the ground when the teeth are in or out of operative engagement with the soil and at the same time leave the independent sections of the frame free to move or be moved above the horizontal plane of the support without carrying the support with the frame, thereby combining the advantages of a float and a wheel harrow in the one implement.

The invention consists in certain novel features of construction and in combinations and in arrangements of parts, as more fully and particularly described and pointed out hereinafter, and examples of which are illustrated in the accompanying drawings.

Figure 1:
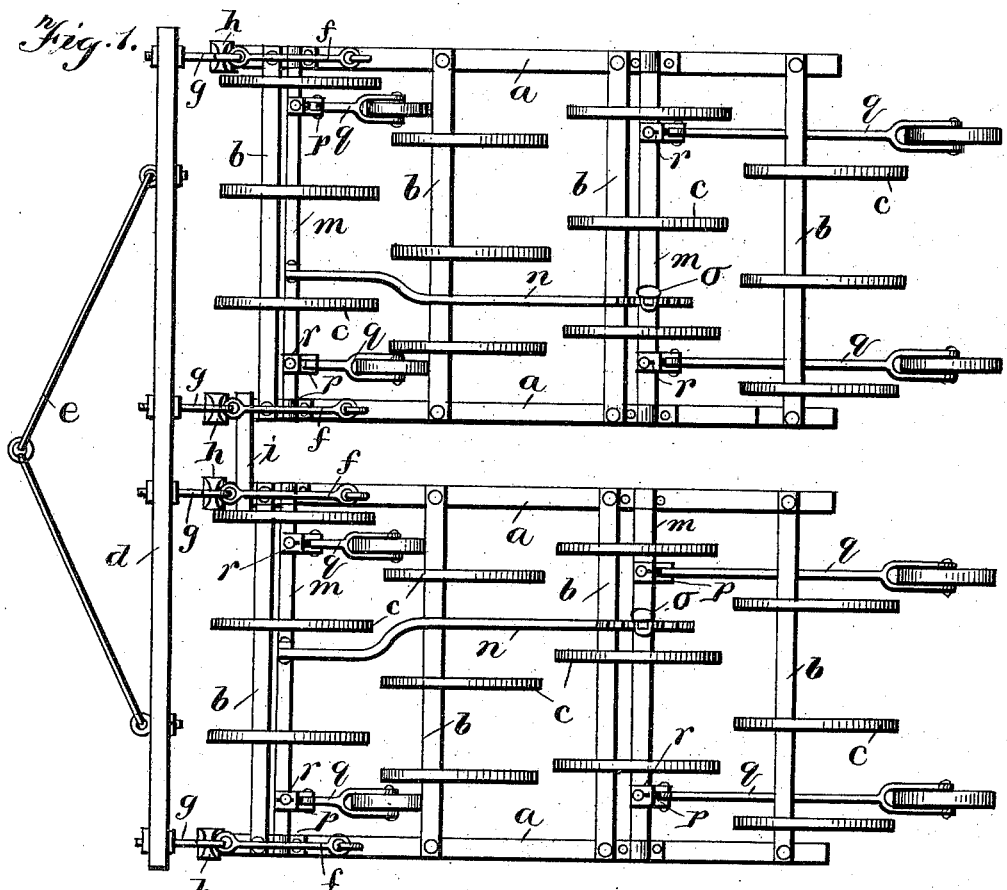
Figure 2:
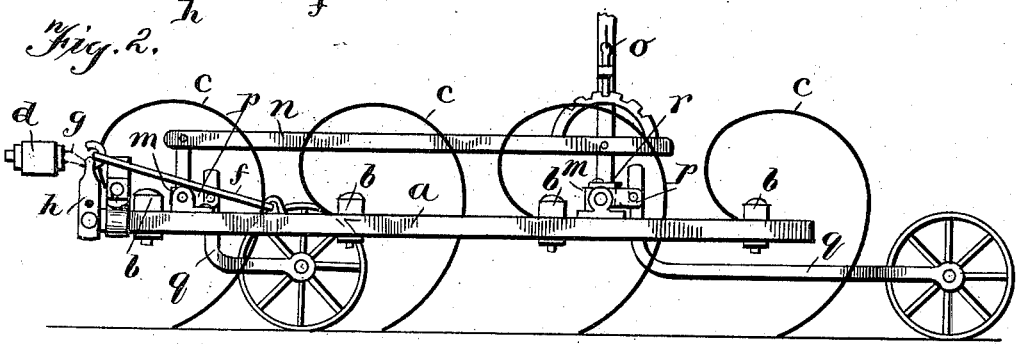
Figure 3:
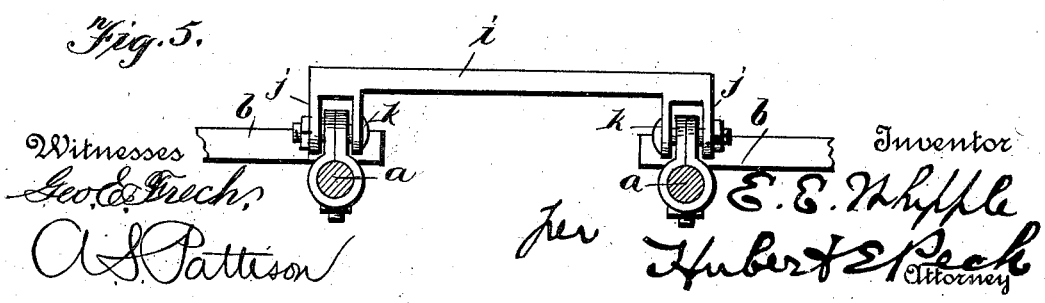

Referring to the accompanying drawings, Figure 1 is a plan view of a two-section harrow provided with my improved attachments. Fig. 2 is a side elevation of the harrow, showing the same in operative cultivating position or adjustment. Fig. 3 is a side elevation showing the harrow raised from operative position and carried by the wheeled supports. Fig. 4 is a detail perspective view of one of the wheeled supports, showing the manner of connecting the same to the harrow. Fig. 5 is a detail view, partially in section, showing a coupling between the harrow-sections. Fig. 6 is a top plan view of the construction shown in Fig. 4. Fig. 7 is a detail view showing a wheeled support partially connected at its upper end to the front side of the rocking beam, with the stop at the under side of the beam. Fig. 8 is a detail view showing a coupling having its lower ends coupled direct to tooth-beams of the harrow-sections. Fig. 9 is a detail view showing a coupling having its ends loosely confined between the double side frame-rails. Fig. 10 is a detail view showing a different form of stop mechanism for a wheeled support.

For the sake of convenience to illustrate the adaptability and application of my improved attachments I have shown a two-section harrow having the frame-bars *a a* extending in the line of draft or fore and aft, with the frame-bars of each section rigidly connected by the tooth-bars *b b*, carrying suitable harrow-teeth *c*, rigidly or otherwise secured thereto.

*d* is an evener-bar arranged in front of both sections of the harrow and to which any suitable draft attachments, such as *e*, are secured to couple the draft-animals thereto.

In operating drag or float harrows or like implements, particularly in certain kinds of soil, great difficulty is often experienced by reason of the nose or front end of the harrow pulling up from the ground or in some instances by reason of its driving down into the ground, so that the harrow does not accurately follow the surface of the ground nor remain parallel with the same. To overcome such difficulties, I provide draft connections *f f* from the evener-bar to each harrow-section and coupled thereto a distance rearwardly from its front end. In the example specifically illustrated the evener-bar is provided with an eye or hook bolt *g* for each draft connection, with the hook or eye arranged at the rear edge of the bar. Each draft-link *f* is at its front upper end loosely confined on said hook or eye at a point usually over the front extremity of the harrow-frame, and from thence extends downwardly and rearwardly, and at its lower rear end is loosely coupled to a frame-bar at a suitable distance rearwardly from its front end. Usually each harrow-section has two draft-links *f f* from its frame-bars to the evener-bar, so that the draft on the section is equally distributed. In order to control the nose or front extremity of the harrow and cause the harrow to move over the surface of the ground approximately parallel therewith, adjustable connections, stops, or supports, such as $h$, are provided between the front extremity of the harrow-frame and the evener-bar. Such connections can be arranged in any desirable and advantageous relation to the draft-links, and one or more can be provided at the front end of each section. Where the peculiar style of frame shown in the drawings is employed, an adjustable connection $h$ is usually provided at the front end of each frame-bar and beneath each draft-link. However, of course my invention is not limited to such particular arrangement nor to the exact construction of draft connections or links $f$.

The example of adjustable connection $h$ specifically illustrated comprises a vertically-adjustable eyebolt, hook, or clip or staple, having its vertical portion bolted or otherwise secured to the front extremity of the harrow-frame and having a series of bolt-holes or otherwise formed to permit vertical adjustment in relation to the harrow-frame and at its upper end loosely confined on the eye or hook $g$ of the evener-bar. If the adjustable connection is arranged at some other point than beneath a draft-link, of course an independent connection can be provided to secure it loosely to the evener-bar. By reason of the adjustable connection the front end of the harrow can be raised or lowered, and thereby held down or up in the desired position, while all the draft on the harrow is through the draft-links $f$ to a point in rear of the front ends of the frame, thereby permitting the vertical adjustment of the front ends of the harrow, although there is no draft on the adjustable connections. It should be noted that this draft arrangement can be easily applied to many styles of harrows and can be made and sold independently and applied to harrows or other like implements by the users.

Where several-section harrows of certain constructions are employed great difficulty is often experienced because the harrow will sag or bulge or rise up at the center and thereby prevent proper operation of the teeth, and also because of the tendency to running, jumping, rocking, and unsteady running of the harrows when working in hard ground or set to work deep. To obviate such difficulties, I provide a coupling between the sections, such as $i$, which is rigid within itself and is arranged over the front ends of the sections and over the ground-bearings or supports thereof and which bridges the space between the sections, and at its opposite ends is journaled to any suitable parts or portions of the sections near their adjoining sides as to permit independent vertical swing of the rear ends of the sections, yet ordinarily to prevent independent lateral swing or dropping thereof.

The specific example shown in the drawings is composed of a rigid bar $i$, having its ends dropped to form what might be called a U-shaped piece. These ends are journaled to any suitable portions of the sections, such as the frames or tooth-bars. However, the coupling can be formed in any other desirable manner to suit different makes of harrows, as by having a straight rigid bar with coupling means depending from its ends. The depending ends are bifurcated in the line of draft to pass down on opposite sides of the ears $j$, projecting up from the frame-bars at the inner sides of the sections. Bolts $k$ are passed through the bifurcated ends and the ears forming pivots extending transversely to the line of draft on the harrow. If the bolts are drawn up tightly, the harrow-sections will be held rigidly together and against lateral play or sagging in the center and in approximately the same horizontal plane, but yet so that the rear ends of the sections can be independently lifted to clear the harrow of trash or for other reasons, the sections at their front ends turning on or in the ends of the coupling and on the front end supports or ground-bearings. The ends of the couplings can be journaled to the sections in many different ways other than by the method described, and my invention is not limited in this respect, and, if desired, the connections between the coupling and sections can be slightly loosened when desired, which will permit a slight but not ordinarily objectionable independent play of the sections. It should also be noted that this coupling can be easily made and sold independently and applied by the user to many kinds of harrows and like implements without changing the principle of the construction thereof and where two or more sections are employed.

Heretofore in some instances rigid tooth-bar harrows have been made with lever-controlled rocking bars having curved shoes rigidly attached thereto, so that when the levers are thrown back the shoes will be forced to the ground and thereby raise the harrow until the teeth clear the ground, whereby the harrow is supported on the shoes. However, it has been found in practice that there are certain material objections to such supporting means, and I have been able to efficiently overcome such objections by providing a wheeled support comprising rearwardly-extending arms carrying wheels and at their front ends connected to rocking bars, so that when the harrow is in operation the arms can freely swing vertically as the wheels follow the surface of the ground, but so that when the levers are operated to throw the harrow out of operative position said wheeled arms will be locked to the rocking bars and the harrow raised and supported thereon with the teeth clear of the ground, so that the wheels carry the entire device. In the example of this feature of the invention illustrated, $m$ $m$ are the rocking bars suitably journaled on or in the frame-bars and usually arranged parallel with the rigid tooth-bars and extending the width of the section. Two rocking bars are shown arranged, respectively, at the front and rear portion of the harrow-section and connected by the adjusting-bar $n$, pivotally joined to a standard from the forward rocking bar and to the operating hand-lever $o$, rigid with the rear rocking bar and carrying a hand-operated pawl engaging with a rack on the adjusting-bar $n$, as usual in lever-adjustment harrows and like implements.

While I show only two rocking bars, it is obvious that a greater number might be employed or possibly a less number if supporting-shoes be mounted at the front extremity of the frame.

Between the sides of the frame each rocking bar has near its opposite ends pairs of rearwardly-projecting ears $p$ $p$ or other suitable attaching means.

$q$ are horizontally-disposed rearwardly-extending sustaining bars, arms, or frames having suitable small supporting or caster wheels journaled in their rear ends. Usually each arm, frame, or bar has one wheel mounted in a bifurcation in the end thereof. The front portion of each sustaining-bar is deflected upwardly and is pivoted between a pair of ears a distance from the edge of the rocking bar and usually extending upwardly above the ears. A stop $r$ is arranged on the rocking bar and opposite the sustaining-bar and either above or below the pivotal point of the sustaining-bar. For instance, in Fig. 4 a stop $r$ is shown on the upper face of the rocking bar extending over the inner portions of the ears and opposite the inner edge of the sustaining-bar and longitudinally slotted and held by a clamping-bolt, so that the stop can be adjusted with respect to the edge of the sustaining-bar.

In the arrangement shown in the drawings each harrow-section is provided with four wheeled sustaining-bars, two in front and two in rear and arranged at the opposite sides of the section and each free to swing vertically independently of each other and of the harrow when the harrow is in operative adjustment. The arrangement of the sustaining-bars and their pivotal points in relation to the stops is such that when the operating hand-levers are swung forward and the harrow is in operative position the stops are arranged a suitable distance from the sustaining-bars, leaving them free to swing vertically between the ears or any other joint which may be arranged between them and the rocking bars. When it is desired to throw the harrow from operative adjustment and lift the teeth from the ground, so that the harrow can be easily moved from place to place or field to field, the hand operating-levers are drawn back, which so rocks the rocking bars as to bring the stops against the sustaining-bars to one side of the pivotal joints thereof and thereby locking the sustaining-bars rigid with the rocking bars, so that the continued rocking movement of the rocking bars lifts the harrow and its teeth from the ground and throws the entire weight thereof on the sustaining-bars and their wheels, so that the harrow can be easily moved from place to place on the wheels.

When it is desired to use the harrow, the levers are moved forward, and as the rocking bars turn the harrow gradually drops as the pivoted ends of the sustaining-bars swing away from the stops.

The sustaining-bars are arranged in a plane beneath the frame and tooth-bars, and the forward wheels are arranged between the teeth and are of such a diameter as not to interfere in any way with the operation of the harrow, while the forward sustaining-bars are comparatively short, so that the forward rocking bar, sustaining-bars, and wheels will be arranged between the forward tooth-bars or sets of teeth. The rear rocking bar is usually arranged in advance of the rear tooth-bar, while the rear sustaining-bars are longer than the forward sustaining-bars and extend rearwardly beneath the rear tooth-bar and usually have their wheels in rear of the rear teeth and the harrow. Notwithstanding the difference in length between the front and rear sustaining-bars the parts are so arranged and combined that the harrow will be simultaneously raised at both ends approximately the same distance when the hand-levers are operated to throw the harrow from operative position.

It is obvious that the rocking bar can be provided in any suitable or desirable manner with a stop to engage the sustaining-bar when the relative positions of the rocking and sustaining bars are varied to a certain degree; that the stops can be arranged above or below the pivotal points of the sustaining-bars and at the front, top, bottom, or rear edges of said sustaining-bars, and that the sustaining-bars can be pivotally joined in any desirable manner to the front, top, bottom, or rear sides of the rocking bars, and that the construction can be varied in many ways without departing from the spirit and scope of my invention.

If desired, only one forward supporting-wheel can be used, mounted to turn like a caster-wheel; also, all the supporting-wheels can yield laterally.

The peculiar arrangement of wheeled support herein set forth obviates the disadvantages present where the supporting-wheels are rigidly mounted on or secured to the frame, which necessitates the harrow constantly carrying the weight of the wheels and attachment whether in or out of operative adjustment, thereby rendering the harrow too heavy for practical success.

It is evident that the wheeled support can be made and sold independently of the harrows and can be easily applied by the user to several styles of harrow.

It is evident that various changes might be made in the forms, constructions, and arrangements of the parts which are herein specifically described for the sake of clearness only without departing from the spirit and scope of my invention. Hence I do not limit my invention to the specific constructions set forth.

What I claim is—

1. In a harrow, an evener-bar having eyebolts rigid therewith and extending rearwardly therefrom, the harrow-sections having draft connections from said eyebolts to said sections in rear of their front ends, and rigid bars secured to and extending up from said harrrow-sections and at their upper ends loosely confined directly to said eyebolts to hold the evener-bar at the desired elevated point, substantially as described.

2. In a harrow, a draft-link extending forwardly and upwardly from the harrow in rear of its front end to a point about over its front end or nose, a vertical bar rigidly secured to the nose of the harrow and extending up therefrom with an eye or opening at its upper end, and a draft connection confined to said eye of said bar and to which the front end of said link is confined to receive the draft therefrom to the harrow, substantially as described.

3. A draft attachment for harrows and the like comprising an evener-bar or its equivalent, draft-links extending downwardly and rearwardly from the bar and loosely connected to opposite sides of the harrow in rear of its front end or nose, an eye or hook rigid with the bar, and a connection rigidly secured to the front end of the harrow-frame in vertical adjustment and loosely confined to said eye or hook, substantially as described.

4. A coupling for the sections of a harrow, rigid within itself, in combination with a several-section harrow having the coupling arranged over the space between the sections at the front end thereof and at its ends journaled to both sections at their inner sides so that the sections can be independently lifted at the rear, but so that the sections will be held together against independent lateral play or vertical play at their inner sides, substantially as described.

5. A coupling for the sections of a harrow, in combination with said sections, said coupling arranged between the front portions of the sections approximately over the ground bearings or supports thereof, and journaled to both sections at or near the adjoining sides thereof, substantially as described.

6. A coupling for the sections of a harrow, in combination with said sections, said coupling comprising a rigid bar formed at its ends for loose connection with both sections to normally hold them against independent lateral play or sagging or rising at the center of the harrow, substantially as described.

7. A wheeled support for harrows and the like, in combination with a harrow, said support comprising wheeled sustaining-bars at their upper ends pivotally joined to rocking bars of the harrow so that said sustaining-bars can play vertically independently of the harrow when the harrow is in operative position, said rocking bars so arranged as to lock said bars thereto when the rocking bars are moved beyond certain points, substantially as described.

8. A wheeled attachment for harrows and the like, in combination with a harrow having rocking bars provided with a lever adjustment, said attachment comprising supporting-bars having wheels with a deflected end pivotally joined to the rocking bars and so arranged in relation thereto that when the rocking bars are turned beyond certain points the supporting-bars will be locked thereto and the harrow raised thereon, and so that the harrow will be free to rise and fall independently of said supporting-bars and wheels when the rocking bars are in their normal positions, substantially as described.

9. A wheeled support for harrows and the like, in combination with a harrow having rocking bars and locking and actuating means therefor, said support comprising supporting-bars provided with wheels and generally arranged beneath the plane of the harrow, said supporting-bars pivotally joined to the rocking bars and so arranged in relation thereto that when the rocking bars are turned beyond certain points the supporting-bars will be locked thereto and the harrow will be raised and upheld by said bars, and so that the harrow will be free to rise independently of the supporting-bars and their wheels when the rocking bars are in their normal positions, substantially as described.

10. A wheeled support for harrows and the like, in combination with a harrow, having rocking bars provided with actuating and locking means and with stops, said support comprising supporting-bars arranged at the front and rear portions of the harrow and beneath the general horizontal plane of the harrow, each bar having a wheel at its rear end with its front upper end pivotally joined to a rocking bar opposite a stop thereof, and the stops being so arranged in relation to the supporting-bars that the supporting-bars are free to swing when the rocking bars are in their normal positions and the harrow in operative adjustment, but so that the stops will engage the bars, and carry the harrow and support it at a given horizontal plane above the ground, substantially as described.

11. A harrow having rocking bars at its front and rear portions, respectively, provided with actuating and locking means, in combination with several supporting-bars horizontally disposed beneath the plane of the harrow, and each having a wheel at its rear end, the front rocking bar having the front ends of the front supporting-bars pivotally joined thereto near its opposite ends, the rear rocking bar also having the rear supporting-bars pivoted thereto near its opposite ends, the rear supporting-bars extending rearwardly beneath the harrow with their wheels in rear of the harrow, substantially as described.

12. A harrow having rearwardly-extending sustaining-bars or supports arranged to travel on the ground, and at their front or upper portions loosely connected with the harrow, and arranged to abut against portions of the harrow to hold it elevated from the ground, said supports arranged at the front and rear portions of the harrow, substantially as described.

13. In combination, several harrow-sections, an evener or draft bar arranged in front thereof, draft connections from opposite sides of each section, respectively, at distances in rear of the front ends thereof, to said evener-bar, and a vertical connection from the nose of each section, respectively, rigid within itself and holding the evener-bar at the desired elevation above the nose of each harrow-section, substantially as described.

14. A harrow having supports generally arranged beneath the plane of the harrow and coupled loosely thereto at their upper or forward ends, and stops carried by the harrow and arranged to one side of the joints between said supports and the harrow and arranged to engage the same and throw and carry the weight of the harrow onto the supports, substantially as described.

15. A harrow having rigid frame tooth-bars, and depending front supports, and lever-actuated rocking bars, in combination with a wheeled attachment connected with each rocking bar, and supporting mechanism for supporting the frame-sections in an elevated position above the ground and leave the sections free to move above the horizontal line of the support.

16. A harrow having rigid frame-bars carrying curved spring harrow-teeth and depending front supports, in combination with wheeled attachments connected with each harrow-section and extending beneath the frames thereof, and supporting mechanism for supporting the frame-sections on said wheeled attachments above the ground and leaving the sections free to move above the horizontal line of the support.

17. The combination of a rigid-tooth-bar harrow with wheeled attachments carrying extended arms or supports extending beneath and pivoted to each section of the frame, for carrying the frame in an elevated position above the ground.

In testimony whereof I affix my signature in presence of two witnesses.

EFFINGER E. WHIPPLE.

Witnesses:
FENNIMORE WHIPPLE,
HANNAH M. WHIPPLE.